(12) United States Patent
Yokoi

(10) Patent No.: US 11,959,409 B2
(45) Date of Patent: Apr. 16, 2024

(54) INTERNAL-COMBUSTION-ENGINE WARM-UP APPARATUS

(71) Applicant: ISUZU MOTORS LIMITED, Tokyo (JP)

(72) Inventor: Takeshi Yokoi, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 18/182,230

(22) Filed: Mar. 10, 2023

(65) Prior Publication Data

US 2023/0304426 A1    Sep. 28, 2023

(30) Foreign Application Priority Data

Mar. 25, 2022    (JP) ................ 2022-049276

(51) Int. Cl.

| | | |
|---|---|---|
| F01N 3/20 | (2006.01) | |
| F01N 3/02 | (2006.01) | |
| F01N 3/023 | (2006.01) | |
| F01N 3/027 | (2006.01) | |
| F01N 3/30 | (2006.01) | |
| F01N 3/32 | (2006.01) | |
| F02D 43/00 | (2006.01) | |

(52) U.S. Cl.
CPC ......... F01N 3/2013 (2013.01); F01N 3/0205 (2013.01); F01N 3/306 (2013.01);
(Continued)

(58) Field of Classification Search
CPC ...... F01N 3/0205; F01N 3/027; F01N 3/0275; F01N 3/028; F01N 3/0234; F01N 3/0892; F01N 3/0296; F01N 3/103; F01N 3/2006; F01N 3/2013; F01N 3/202; F01N 3/2026; F01N 3/22; F01N 3/30; F01N 3/306; F01N 3/32; F01N 3/2066; F01N 5/02; F01N 9/00; F01N 13/004; F01N 2240/02; F01N 2240/04; F01N 2240/05; F01N 2240/16; F01N 2260/02; F01N 2260/022; F01N 2550/22; F01N 2900/0602; F01N 2900/08; F01N 2900/1626; F01N 2900/1404;

(Continued)

(56) References Cited

U.S. PATENT DOCUMENTS

| | | | |
|---|---|---|---|
| 2006/0130469 A1* | 6/2006 | Baeuerle ................ | F02B 37/18 60/300 |
| 2014/0208754 A1* | 7/2014 | Nagai .................... | F02G 5/04 60/655 |

(Continued)

FOREIGN PATENT DOCUMENTS

JP    2010112296 A    5/2010

*Primary Examiner* — Binh Q Tran
(74) *Attorney, Agent, or Firm* — Shih IP Law Group, PLLC

(57) ABSTRACT

An internal-combustion-engine warm-up apparatus includes: a post-processing apparatus; a heater arranged upstream of the post-processing apparatus on the exhaust path; a circulation path where air having passed through the post-processing apparatus is fed back to an upstream side of the heater; an air pump that is a blower that feeds air heated by the heater to the post-processing apparatus; a coolant flow path; a heat exchanger; and a control apparatus that controls operation of the heater and the blower, and in a state where the engine is stopped, the control apparatus causes the heater and the air pump to operate, and causes the air heated by the heater to be supplied to the post-processing apparatus and the heat exchanger.

7 Claims, 3 Drawing Sheets

(52) U.S. Cl.
CPC .............. *F01N 3/32* (2013.01); *F02D 43/00* (2013.01); *F01N 3/0234* (2013.01); *F01N 3/027* (2013.01); *F01N 3/0275* (2013.01); *F01N 3/202* (2013.01); *F01N 3/2026* (2013.01); *F01N 3/2066* (2013.01); *F01N 3/30* (2013.01); *F01N 2240/02* (2013.01); *F01N 2240/04* (2013.01); *F01N 2240/16* (2013.01); *F01N 2260/022* (2013.01); *F01N 2900/0602* (2013.01); *F01N 2900/08* (2013.01); *F01N 2900/1626* (2013.01)

(58) Field of Classification Search
CPC ............. F01N 2900/1602; F02D 43/00; F02D 41/068; F02D 41/042; F02D 2200/0802; F02D 41/025; F02D 41/1446; F02D 41/024; Y02T 10/12
See application file for complete search history.

(56) References Cited

U.S. PATENT DOCUMENTS

| | | | |
|---|---|---|---|
| 2015/0121848 A1* | 5/2015 | Pursifull | F01N 5/02 60/274 |
| 2016/0109163 A1* | 4/2016 | Enomoto | F25B 13/00 62/160 |
| 2017/0082008 A1* | 3/2017 | Kim | F01N 5/02 |
| 2017/0335805 A1* | 11/2017 | Zhang | F01N 5/025 |
| 2018/0156143 A1* | 6/2018 | Hussain | F02D 41/0055 |
| 2021/0231067 A1* | 7/2021 | Van Nieuwstadt | F01N 3/0293 |

* cited by examiner

INTERNAL-COMBUSTION-ENGINE WARM-UP APPARATUS

CROSS-REFERENCE TO RELATED APPLICATIONS

The present application claims priority to Japanese Patent Applications number 2022-49276, filed on Mar. 25, 2022. The contents of this application are incorporated herein by reference in their entirety

BACKGROUND OF THE INVENTION

Japanese Patent Application Publication No. 2010-112296 proposes to warm catalysts for activating the catalysts.

Engines of vehicles such as HEVs (Hybrid Electric Vehicles) or PHEVs (Plug-in Hybrid Electric Vehicles) do not operate in a state where their motors are being driven. By warming catalysts while an engine is stopped, it is possible to reduce exhaust gas favorably even immediately after the motor-driving state switches to an engine-driving state. On the other hand, there has been a problem that the temperature of the engine is low immediately after the switch to the engine-driving state, and the operation performance of the engine lowers.

SUMMARY OF THE INVENTION

The present invention has been made in view of these matters, and an object of the present invention is to provide an internal-combustion-engine warm-up apparatus that can warm up an engine efficiently in a case that catalysts are warmed by a heater in a state where the engine is stopped.

An aspect of the present invention provides an internal-combustion-engine warm-up apparatus including: a post-processing apparatus that has a catalyst, and removes nitrogen oxides in exhaust gas discharged from an engine in an exhaust path where the exhaust gas passes; a heater arranged upstream of the post-processing apparatus on the exhaust path; a circulation path where air having passed through the post-processing apparatus is fed back to an upstream side of the heater; a blower that feeds air heated by the heater to the post-processing apparatus; a coolant flow path where a coolant of the engine flows; a heat exchanger that warms the coolant in the coolant flow path by causing heat exchange between the heated air having passed through the post-processing apparatus and the coolant; and a control apparatus that controls operation of the heater and the blower, in which in a state where the engine is stopped, the control apparatus causes the heater and the blower to operate, and causes the air heated by the heater to be supplied to the post-processing apparatus and the heat exchanger.

DESCRIPTION OF THE PREFERRED EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment (Overview of Internal Combustion Engine 100)

Figure 1:
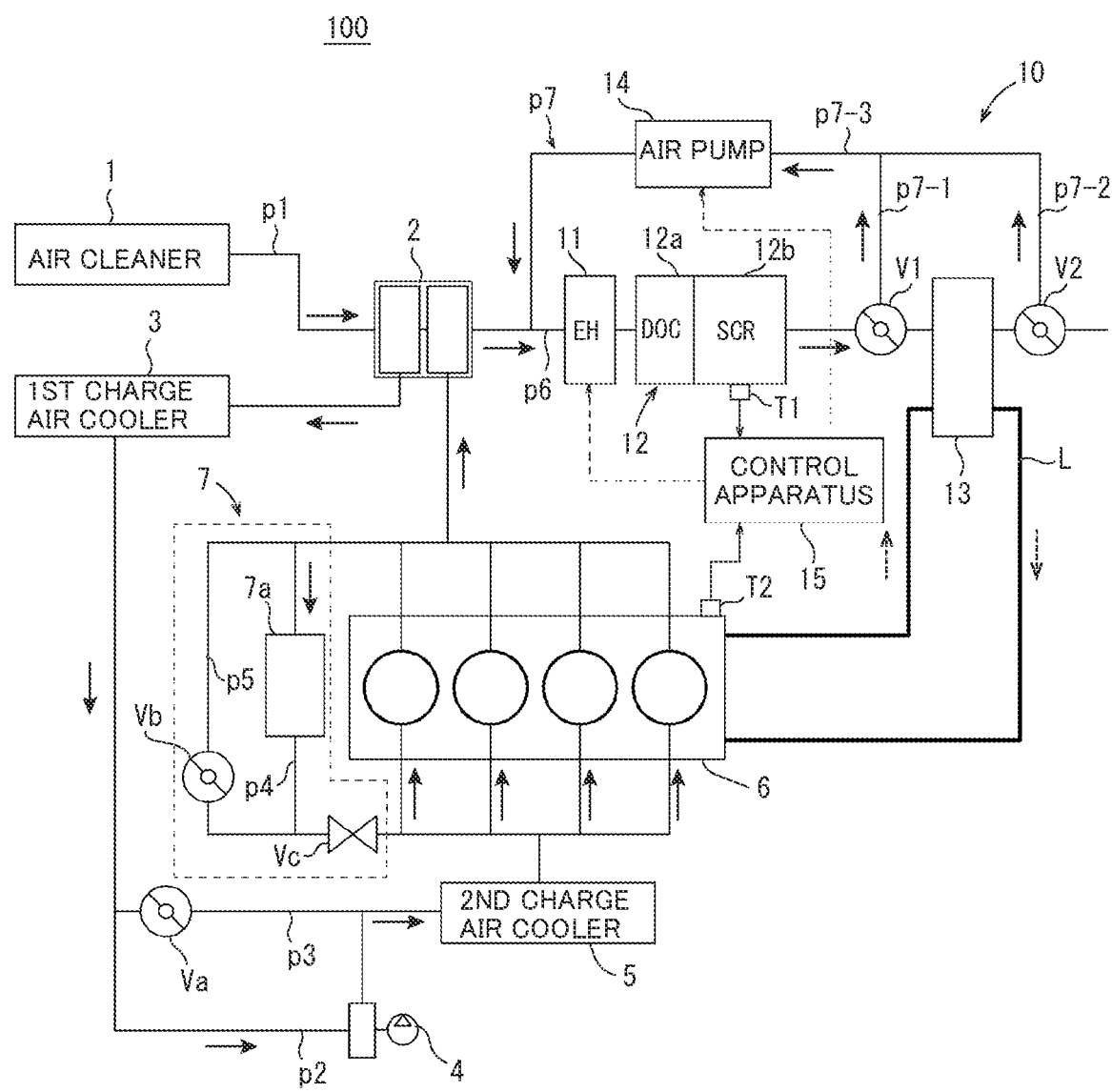
FIG. 1 is a figure depicting the configuration of an internal combustion engine in an embodiment according to the present invention.

FIG. 1 is a figure depicting the configuration of an internal combustion engine 100 in an embodiment according to the present invention. Arrows in FIG. 1 represent flows of air. As an example, the internal combustion engine 100 is an internal combustion engine provided in a vehicle such as an HEV (Hybrid Electric Vehicle) or a PHEV (Plug-in Hybrid Electric Vehicle).

The internal combustion engine 100 mainly includes an air cleaner 1, a turbocharger 2, a first charge air cooler 3, an electric supercharger 4, a second charge air cooler 5, an engine 6, an EGR pipe section 7 and a warm-up apparatus 10.

Since flows of air at a time of operation of the engine 6 are basically similar to typical flows of air in this type of internal combustion engine, the flows of air are explained only simply. During operation of the engine 6, air sucked into the vehicle passes through the air cleaner 1, the turbocharger 2, the first charge air cooler 3, the electric supercharger 4 and the second charge air cooler 5, and is supplied to the engine 6. Part of exhaust gas discharged from the engine 6 is fed back to the air-supply side of the engine 6 by the EGR pipe section 7. Other part of the exhaust gas discharged from the engine 6 passes through the turbocharger 2, and then flows into the warm-up apparatus 10.

As mentioned later in detail, one of features of the internal combustion engine 100 according to the present embodiment is that the warm-up apparatus 10 is formed on the exhaust-side of the engine 6. While the engine 6 is stopped, the warm-up apparatus 10 causes a heater 11 and an air pump 14 to operate, and supplies air heated by the heater 11 to a post-processing apparatus 12 and a heat exchanger 13. Thereby, catalysts in the post-processing apparatus 12 are warmed. In addition, an engine coolant in a coolant flow path L also is warmed, and accordingly the engine 6 also is warmed up.

According to such configuration, it is possible to warm the catalysts in the post-processing apparatus 12 while the engine 6 is stopped, and raise the temperatures of the catalysts to activation temperatures. In addition, by warming the engine coolant by using energy for warming the catalysts in the post-processing apparatus 12, the engine 6 can be warmed up efficiently.

(Configuration of Each Section)

Each section of the internal combustion engine 100 is explained below. The air cleaner 1 is a filter to remove foreign matters in air sucked into the engine 6. The air taken in through the air cleaner 1 is supplied to the turbocharger 2 through an intake path p1.

The turbocharger 2 rotates a turbine by using exhaust of the engine 6 to thereby compress the air taken in through the intake path p1. By supplying the air compressed by the turbocharger 2 to the engine 6, torque generated by the engine 6 in one combustion stroke is increased.

The first charge air cooler 3 cools air that has been compressed by the turbocharger 2, and has an increased temperature. Since the air is cooled, the density of the air that the engine 6 sucks in is increased.

The electric supercharger 4 is an apparatus that supplies the engine 6 with compressed air compressed by drive force of a motor which is not depicted. The electric supercharger 4 is arranged on a path p2 connecting the first charge air cooler 3 and the second charge air cooler 5. In a state where the electric supercharger 4 is not supplying compressed air to the engine 6, the electric supercharger 4 inhibits passage of air through the electric supercharger 4. Accordingly, in this state, air is supplied to the second charge air cooler 5 not through the path p2, but through a path p3 which is a bypass path. A valve Va is arranged on the path p3. For example, the valve Va is a solenoid valve, and switches the opened/closed state of the path p3. Specifically, the valve Va switches the opened/closed state of the path between a state where air passes through the path and a state where air does not pass through the path.

In a state where the engine 6 is stopped, the electric supercharger 4 supplies compressed air to the exhaust-side of the engine 6 through the EGR pipe section 7. An example in which the electric supercharger 4 functions as a blower of the warm-up apparatus 10 is explained in a second embodiment.

The second charge air cooler 5 cools air that the engine 6 sucks in. For example, the engine 6 generates drive force by converting a reciprocating motion of a cylinder caused by combustion of a liquid fuel such as light oil into rotational force. FIG. 1 depicts an example of a 4-cylinder diesel engine.

The EGR pipe section 7 is a structure portion for feeding part of exhaust gas of the engine 6 back to the air-supply side of the engine 6. The EGR pipe section 7 has a path p4, a path p5, an EGR cooler 7a, a valve Vb and a valve Vc. The path p4 and the path p5 are arranged in parallel, and connect the air-supply side and exhaust-side of the engine 6.

The EGR cooler 7a is arranged on the path p4, and cools exhaust gas that is fed back from the exhaust-side to the air-supply side of the engine 6. The valve Vb is arranged on the path p5. For example, the valve Vb is a solenoid valve, and switches the opened/closed state of the path p5 between a state where air passes through the path p5 and a state where air does not pass through the path p5. The valve Vc switches the opened/closed state of the path in the EGR pipe section 7 between a state where air passes through the path and a state where air does not pass through the path.

By part of exhaust gas being fed back to the intake-side of the engine 6 through the thus-configured EGR pipe section 7, the maximum temperature at a time of combustion in the engine 6 lowers. As a result, the generation amount of nitrogen oxides is reduced. In a state where the engine 6 is stopped, compressed air from the electric supercharger 4 can be supplied to the exhaust-side of the engine 6 through the path p5.

(About Warm-Up Apparatus 10)

The warm-up apparatus 10 mainly has an exhaust path p6, the heater 11, the post-processing apparatus 12, a circulation path p7, a first valve V1, a second valve V2, the heat exchanger 13, the coolant flow path L, the air pump 14 and a control apparatus 15.

The exhaust path p6 is a path where exhaust gas from the engine 6 flows. The heater 11, the post-processing apparatus 12 and the heat exchanger 13 are arranged on the exhaust path p6 in this order from the upstream side. The terminal section of the exhaust path p6 is exposed to the atmosphere, and exhaust gas having passed through the turbocharger 2 is released to the atmosphere from the terminal section of the exhaust path p6.

The heater 11 heats air flowing in the exhaust path p6. The heater 11 is positioned upstream of the post-processing apparatus 12 on the exhaust path p6. As an example, the heater 11 is an electric-heat coil heater. The heater 11 is driven by electric power from a power supply which is not depicted. Operation of the heater 11 is controlled by the control apparatus 15. The heater 11 heats air to such a sufficient temperature that the catalysts are warmed to a temperature which is equal to or higher than the activation temperatures for the catalysts when the heated air passes through the post-processing apparatus 12.

The post-processing apparatus 12 has the catalysts, and removes nitrogen oxides in exhaust gas on the exhaust path p6. In the example in FIG. 1, the post-processing apparatus 12 includes a DOC 12a and SCR 12b.

The DOC (Diesel Oxidation Catalyst) 12a includes a precious metal catalyst, and oxidizes uncombusted gas in the exhaust from the engine 6. The DOC 12a oxidizes hydrocarbon, carbon monoxides and nitrogen oxides.

The SCR (Selective Catalytic Reduction) 12b removes nitrogen oxides in the exhaust from the engine 6. For example, the SCR 12b is a selectively reducing catalyst that selectively reduces nitrogen oxides in the exhaust by using a reducing agent, to thereby remove the nitrogen oxides.

Immediately after the activation of the engine 6, the temperatures of the catalysts in the post-processing apparatus 12 are lower than the activation temperatures of the catalysts. Because of this, in order to enhance the nitrogen-oxide removing efficiency, the warm-up apparatus 10 warms the catalysts in the post-processing apparatus 12 by using the heater 11.

The circulation path p7 is a path where air having passed through the post-processing apparatus 12 is fed back to the upstream side of the heater 11. The circulation path p7 is equivalent to the first circulation path in the present invention. Specifically, the circulation path p7 has a first branch path p7-1, a second branch path p7-2 and a path p7-3. The first branch path p7-1 is a path that branches off from the exhaust path p6 at a portion located upstream of the heat exchanger 13. The second branch path p7-2 is a path that branches off from the exhaust path p6 at a portion located downstream of the heat exchanger 13. The path p7-3 is a path where air from the first branch path p7-1, and air from the second branch path p7-2 are fed back to the exhaust path p6. Note that as mentioned later in detail, the second branch path p7-2 functions as a bypass path where heated air is fed back to the upstream side of the heater 11 without being supplied to the heat exchanger 13.

The thus-configured circulation path p7 is a path where the air having passed through the post-processing apparatus 12 is fed back to a position that is on the exhaust path p6, and located downstream of the turbocharger 2 and upstream of the heater 11.

The first valve V1 is arranged at the portion where the first branch path p7-1 branches off from the exhaust path p6. As an example, the first valve V1 is a solenoid valve. Operation of the first valve V1 is controlled by the control apparatus 15. The first valve V1 switches between a state where air having passed through the first valve V1 flows only through the first branch path p7-1 (a state where air does not flow through the exhaust path p6 located downstream of the valve V1, but air flows through the first branch path p7-1), and a state where air having passed through the first valve V1 flows only through the exhaust path p6 (a state where air does not flow through the first branch path p7-1, but air flows through the exhaust path p6 located downstream of the valve V1).

The second valve V2 is arranged at the portion where the second branch path p7-2 branches off from the exhaust path p6. As an example, the second valve V2 is a solenoid valve.

Operation of the second valve V2 is controlled by the control apparatus 15. The second valve V2 switches between a state where air having passed through the second valve V2 flows only through the second branch path p7-2 (a state where air does not flow through the exhaust path p6 located downstream of the valve V2, but air flows through the second branch path p7-2), and a state where air having passed through the second valve V2 flows only through the exhaust path p6 (a state where air does not flow through the second branch path p7-2, but air flows through the exhaust path p6 located downstream of the valve V2).

The heat exchanger 13 is arranged on the exhaust path p6, and air having passed through the post-processing apparatus 12, and warmed by the heater 11 passes through the heat exchanger 13. The heat exchanger 13 has a functionality of warming a coolant in the coolant flow path L. Specifically, the heat exchanger 13 causes heat exchange between heated air passing through the heat exchanger 13, and the coolant flowing through the coolant flow path L to thereby warm the coolant in the coolant flow path L.

The coolant flow path L is a flow path in which the engine coolant flows, and originally is a structure portion for cooling the engine 6. In the present embodiment, the engine 6 can be warmed, and a warm-up of the engine 6 can be performed by warming the coolant in the coolant flow path L, and supplying it to the engine 6.

Although not depicted in the figure, a water pump for moving the coolant in the coolant flow path L may be arranged on the coolant flow path L. For example, operation of the water pump is controlled by the control apparatus 15.

The air pump 14 is provided on the circulation path p7, and circulates air heated by the heater 11. The air pump 14 is the blower in the present invention, and feeds the heated air to the post-processing apparatus 12. Specifically, the air pump 14 is arranged on the path p7-3. Operation of the air pump 14 is controlled by the control apparatus 15.

The control apparatus 15 has a CPU (Central Processing Unit) and a storage section. For example, the control apparatus 15 is an ECU (Engine Control Unit). The ECU may be an engine ECU that controls operation of the internal combustion engine 100 or may be an ECU provided separately from the engine ECU.

The control apparatus 15 acquires output values of a temperature sensor T1 that measures the temperatures of the catalysts in the post-processing apparatus 12. The temperature sensor T1 measures the temperature of at least either of the catalyst of the DOC 12a or the catalyst of the SCR 12b.

Also, the control apparatus 15 acquires output values of a temperature sensor T2 that measures the temperature of the engine 6. As an example, the temperature of the engine 6 is used for determining whether or not the engine 6 has been warmed up sufficiently.

The control apparatus 15 controls operation of the heater 11, the air pump 14, the first valve V1 and the second valve V2. Specifically, the control apparatus 15 controls the start and stop of operation of the heater 11, and the output power of the heater 11. In addition, the control apparatus 15 controls the start and stop of operation of the air pump 14, and the output power of the air pump 14.

The storage section of the control apparatus 15 has stored thereon threshold data used for various types of determination by the control apparatus 15. For example, the storage section has stored thereon temperatures of the catalysts in the post-processing apparatus 12 used for a threshold where it is determined that the catalysts need to be warmed up, a target temperature of the catalysts that is set equal to or higher than the activation temperatures of the catalysts, and temperatures of the engine 6 used for a threshold where it is determined that the engine 6 has been warmed up sufficiently. As an example, the target temperature of the catalysts is equal to or higher than 160° C.

(Warm-Up Operation in Engine-Stopped State)

Figure 2:
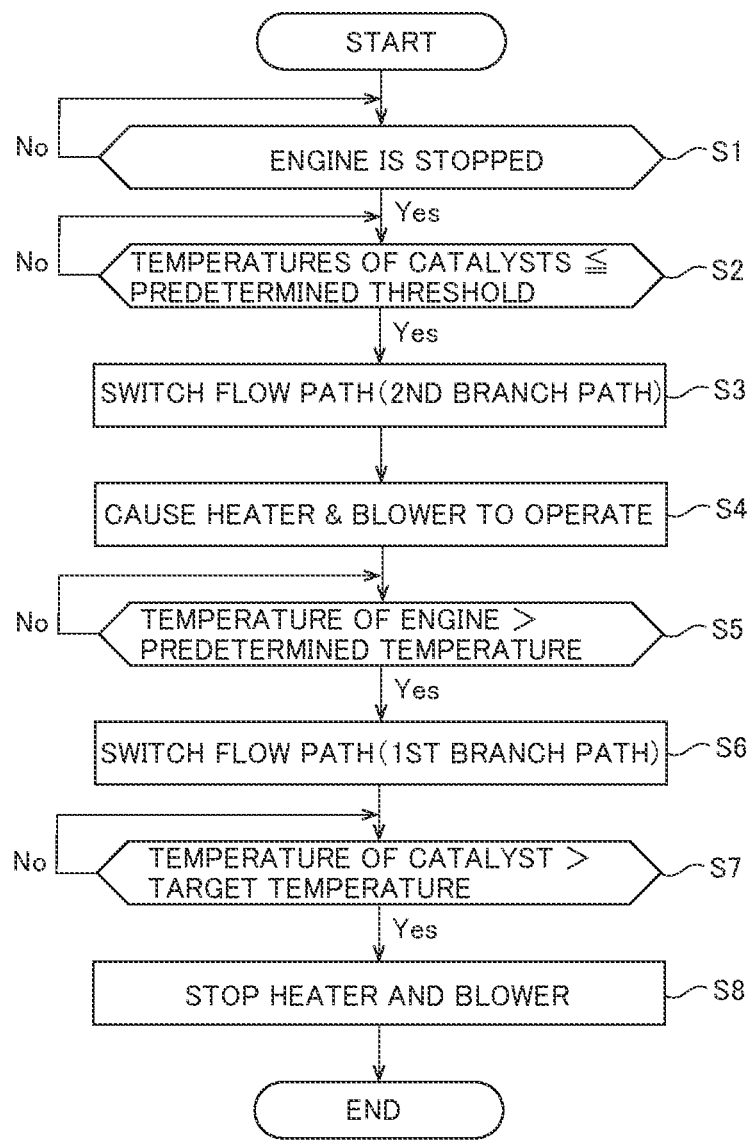
FIG. 2 is a flowchart of warm-up operation performed by a warm-up apparatus in an engine-stopped state.

Operation of the thus-configured warm-up apparatus 10 to warm the engine 6 and the catalysts in the post-processing apparatus 12 in a stopped state of the engine 6 is explained below. FIG. 2 is a flowchart of warm-up operation performed by the warm-up apparatus 10 in an engine-stopped state.

First, at Step S1, the control apparatus 15 determines whether or not the engine 6 is stopped. The control apparatus 15 determines whether or not the engine 6 is stopped on the basis of certain information representing that the engine 6 is stopped. For example, in a case that the vehicle is in a motor drive mode, the control apparatus 15 determines that the engine 6 is stopped.

In a case that the engine 6 is stopped, and the temperatures of the catalysts in the post-processing apparatus 12 are low, it is necessary to warm the catalysts such that the temperatures of the catalysts become equal to or higher than the activation temperatures. In view of this, in a case that the engine 6 is stopped (Yes at Step S1), at Step S2, the control apparatus 15 determines whether or not the temperatures of the catalysts in the post-processing apparatus 12 are equal to or lower than a predetermined threshold. Specifically, on the basis of an output value from the temperature sensor T1, and the threshold stored on the storage section, the control apparatus 15 determines whether or not the temperatures of the catalysts are equal to or lower than the predetermined threshold. Note that in a case that the result of the determination at Step S1 is No, Step S1 is repeated.

In a case that the temperatures of the catalysts are equal to or lower than the predetermined threshold (Yes at Step S2), at Step S3, the control apparatus 15 switches flow paths as a step before warm-up operation is started. The warm-up apparatus 10 according to the present embodiment supplies air heated by the heater 11 to the post-processing apparatus 12 and the heat exchanger 13. In view of this, at Step S3, the control apparatus 15 causes the first valve V1 and the second valve V2 to operate, switches the first valve V1 to a state where air flows only through the exhaust path p6, and switches the second valve V2 to a state where air flows only through the second branch path p7-2. In this state, air having passed through the post-processing apparatus 12 does not flow through the first branch path p7-1, but flows through the heat exchanger 13, and returns to the upstream side of the heater 11 through the second branch path p7-2 and the path p7-3. Note that in a case that the result of the determination at Step S2 is No, Step S2 is repeated.

Next, at Step S4, the control apparatus 15 causes the heater 11 and the air pump 14 (blower) to operate. Thereby, air heated by the heater 11 is supplied to the post-processing apparatus 12 by the air pump 14. Due to the heated air passing through the post-processing apparatus 12, the catalysts in the post-processing apparatus 12 are warmed. Note that the start of operation of the blower may be before completion of the switching of the path states at Step S3.

The heated air having passed through the post-processing apparatus 12 is supplied to the heat exchanger 13 through the exhaust path p6. In the heat exchanger 13, the coolant in the coolant flow path L is warmed due to heat exchange between the heated air and the coolant. When the warmed coolant is supplied to the engine 6, the engine 6 is warmed up.

As an example, the heated air having passed through the heat exchanger 13 is fed back to the upstream side of the heater 11 through the second branch path p7-2 and the path p7-3 without being released to the atmosphere. According to the configuration in which the heated air circulates through the exhaust path p6 and the circulation path p7 in this manner, the catalysts and the coolant can be warmed efficiently.

After the engine 6 is warmed up sufficiently, it is not necessary to supply the heated air to the heat exchanger 13. In view of this, at Step S5, the control apparatus 15 determines whether or not the temperature of the engine has exceeded a predetermined temperature. Specifically, on the basis of an output value from the temperature sensor T2, and the temperature stored as a threshold on the storage section, the control apparatus 15 determines whether or not the temperature of the engine has exceeded the predetermined temperature.

In a case that the temperature of the engine 6 has exceeded the predetermined threshold in a state where the heated air is being supplied to the post-processing apparatus 12 and the heat exchanger 13 (Yes at Step S5), at Step S6, the control apparatus 15 causes the valve to switches flow paths. Specifically, the control apparatus 15 causes the first valve V1 to operate, and to switch to a state where the heated air flows only through the first branch path p7-1, and circulates in the circulation path p7. That is, in this state, the heated air circulates in the circulation path p7 through the first branch path p7-1 and the path p7-3 without being supplied to the heat exchanger 13. By not supplying air to the heat exchanger 13 in a case that the engine 6 is warmed up sufficiently in this manner, the catalysts can be warmed by using energy of the warmed air efficiently. In a case that the result of the determination at Step S5 is No, Step S5 is repeated.

Next, at Step S7, the control apparatus 15 determines whether or not the temperature of the catalyst in the post-processing apparatus 12 have exceeded the target temperature. Specifically, the control apparatus 15 determines whether or not the temperature of the catalyst indicated by an output value from the temperature sensor T1 have exceeded the target temperature of the catalyst stored on the storage section.

In a case that the temperatures of the catalysts have exceeded the target temperature (Yes at Step S7), at Step S8, the control apparatuses 15 stops operation of the heater 11 and the air pump 14. In a case that the result of the determination at Step S7 is No, Step S7 is repeated.

By the series of steps described above, the warm-up apparatus 10 warms the catalysts in the post-processing apparatus 12. In addition, the warm-up apparatus 10 performs a warm-up of the engine 6 by warming the coolant in the coolant flow path L.

(Actions and Advantages)

As explained above, according to the warm-up apparatus 10 according to the present embodiment, in a case that the catalysts in the post-processing apparatus 12 are warmed by the heater 11 in a stopped state of the engine 6, the engine coolant also can be warmed by air heated by the heater 11. Accordingly, a warm-up of the engine 6 can be performed by using energy efficiently.

Since the heater 11 which is a heat source to warm the catalysts in the post-processing apparatus 12 is used as a heat source to warm the coolant, it is not necessary to provide a heat source separately from the heater 11, and the configuration of the warm-up apparatus 10 does not become complicated.

In the present embodiment, in particular, when the engine is warmed up sufficiently after a warm-up of the catalysts in the post-processing apparatus 12 and the engine coolant is started (see Step S5), the flow path is changed by using the first valve V1, and the heated air is caused to circulate through the first branch path p7-1, the path p7-3 and the exhaust path p6. Since the heated air is not supplied to the heat exchanger 13 in this state, energy of the heated air is not used for warming the coolant, but the catalysts in the post-processing apparatus 12 can be warmed up efficiently.

Since two valves, the first valve V1 and the second valve V2, are provided in the present embodiment as depicted in FIG. 1, operation of these valves under the control of the control apparatus 15 can switch between a state where the heated air circulates through the second branch path p7-2, the path p7-3 and the exhaust path p6, and a state where heated air circulate through the first branch path p7-1, the path p7-3 and the exhaust path p6.

In the present embodiment, also, the blower for circulating the heated air can be formed with relatively simple configuration including the circulation path p7, and the air pump 14 arranged on the circulation path p7.

Whereas the specific configuration of the internal combustion engine 100 is explained with reference to FIG. 1 in the explanation described above, the present invention is not necessarily limited to the specific configuration mentioned above. For example, the first valve V1 and/or the second valve V2 may be omitted. The warm-up apparatus 10 may implement the operation of warming the catalysts in the post-processing apparatus 12 and the engine coolant while the air heated by the heater 11 is being released to the atmosphere through the exhaust path p6.

In addition, the coolant flow path L may be provided with a heat exchanger for causing heat exchange between air in the interior of the vehicle and the coolant. By providing such a heat exchanger, it becomes possible also to warm the interior efficiently by using air that is used to warm the catalysts, while the engine 6 is stopped.

Second Embodiment

Figure 3:
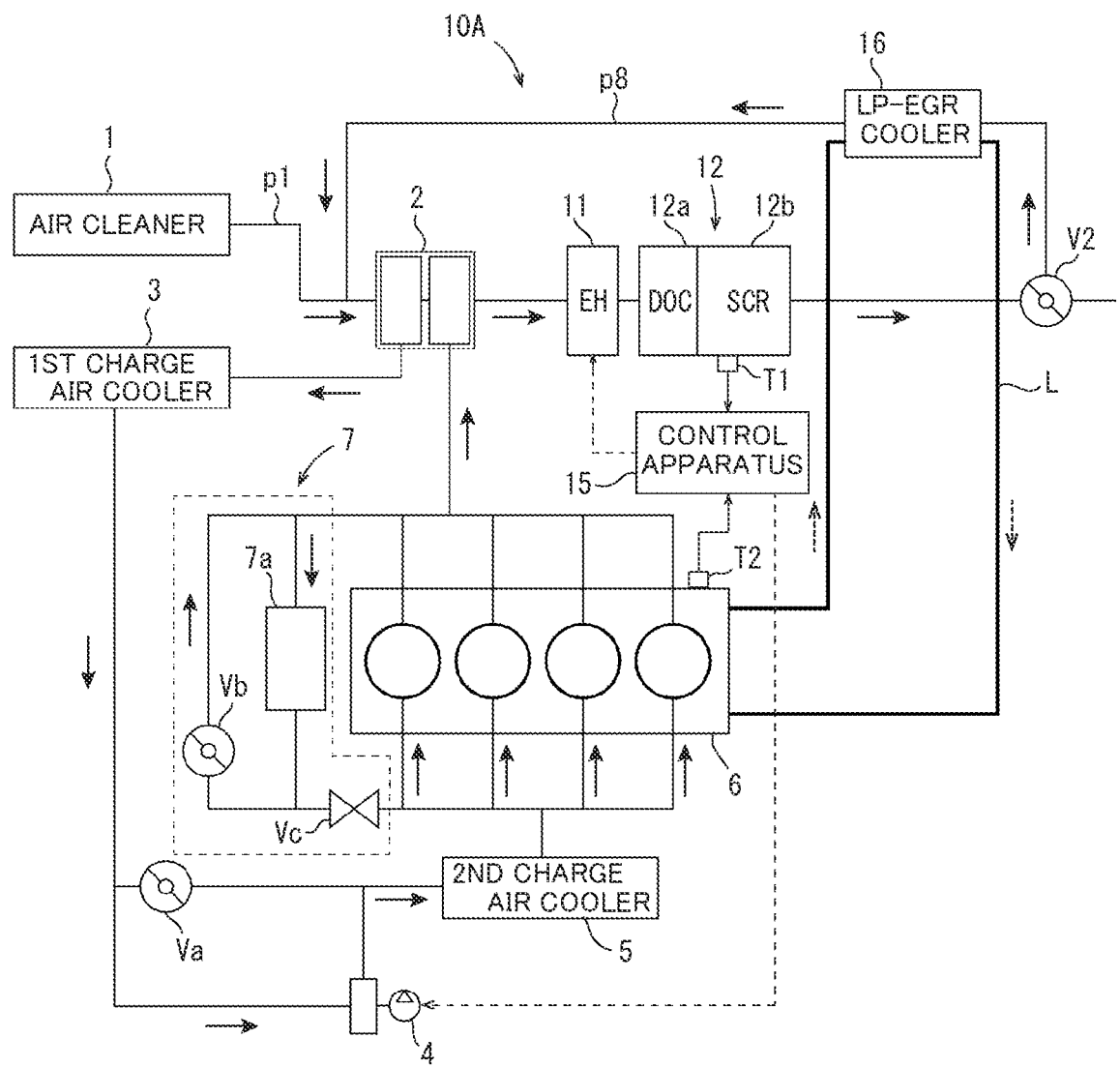
FIG. 3 is a figure depicting the configuration of the internal combustion engine in another embodiment of the present invention.

FIG. 3 is a figure depicting the configuration of the internal combustion engine in another embodiment of the present invention. The configuration of a warm-up apparatus 10A is different from the configuration in the first embodiment, but is similar to the configuration in the first embodiment in other respects.

The warm-up apparatus 10A has the exhaust path p6, the heater 11, the post-processing apparatus 12, a circulation path p8, the second valve V2, an LP-EGR cooler 16, the coolant flow path L and the control apparatus 15. As compared with the configuration of the first embodiment, the heat exchanger 13, the air pump 14, the first valve V1 and the like are omitted in the warm-up apparatus 10A. Since the configuration is similar to the configuration of the first embodiment in other respects, explanations which are common to the first embodiment and the second embodiment are omitted.

The circulation path p8 is a path where air having passed through the post-processing apparatus 12 is fed back to the intake path p1 of the turbocharger 2. The circulation path p8 is equivalent to the second circulation path in the present invention.

The LP-EGR cooler 16 (low pressure EGR, Low Pressure-EGR) is arranged on the circulation path p8. The LP-EGR cooler 16 is an apparatus for feeding exhaust back to the path between the air cleaner 1 and the turbocharger 2. In the configuration in FIG. 2, the LP-EGR cooler 16 has the functionality of a heat exchanger also. Specifically, by causing heat exchange between air heated by the heater 11 and the engine coolant in the coolant flow path L, the LP-EGR cooler 16 warms the coolant to warm up the engine 6.

As in the first embodiment, the control apparatus 15 causes the heater 11 to operate in a state where the engine 6 is stopped, and to heat air for warming the catalysts in the post-processing apparatus 12. In the present embodiment, the control apparatus 15 controls operation of the electric supercharger 4 also. Specifically, the control apparatus 15 causes the electric supercharger 4 to operate, and causes compressed air to be supplied to the upstream side of the heater 11 on the exhaust path p6 through the EGR pipe section 7.

The compressed air supplied to the upstream side of the heater 11 in this manner is heated by the heater 11, and the heated air is supplied to the post-processing apparatus 12 as in the first embodiment. Thereby, the catalysts in the post-processing apparatus 12 are warmed.

The heated air having passed through the post-processing apparatus 12 flows into the circulation path p8 through the exhaust path p6 and the second valve V2. By causing the heated air to flow through the LP-EGR cooler 16, heat exchange is caused between the heated air and the coolant in the coolant flow path L, and the coolant in the coolant flow path L is warmed.

Since the circulation path p8 is connected to the intake path p1 in the configuration in FIG. 3, the air having passed through the LP-EGR cooler 16 is fed back to the upstream side of the turbocharger 2. Thereafter, the air passes through the turbocharger 2, the first charge air cooler 3 and the electric supercharger 4, and is thereafter fed back to the upstream side of the heater 11 again along a flow path similar to that explained mentioned above.

As explained above, in the present invention, the blower for feeding air heated by the heater 11 is not necessarily limited to the air pump 14, but, for example, the blower may be the electric supercharger 4 positioned upstream of the engine 6. According to configuration like the one in FIG. 3, there is an advantage that it is not necessary to provide the air pump 14.

Note that FIG. 3 illustrates an example of configuration in which a turbine is not provided, but an electric compressor having a motor and a compressor is provided. However, an electric assist turbocharger may be used in the present invention. The electric assist turbocharger is a turbocharger having a motor arranged between a compressor and a turbine, and can compress air by drive force of the motor.

Modification Examples

The engine coolant is warmed by using heat for warming up the catalysts in the post-processing apparatus 12 to warm up the engine 6 in the embodiments mentioned above. In one form of the present invention, the warm-up apparatus may warm the interior of the vehicle by using the warmed coolant.

Although the present invention has been explained thus far by using embodiments, the technical scope of the present invention is not limited by the scope of the description of the embodiments described above, but can be modified and changed variously within the scope of the gist. For example, specific embodiments about distribution/integration of apparatuses are not limited to the embodiments mentioned above, and all or some of them can be configured in a functionally or physically distributed/integrated manner in any units. In addition, embodiments of the present invention include new embodiments that are generated by combining any ones of a plurality of embodiments also. Advantages of the new embodiments generated by the combination combine advantages of the original embodiments.

What is claimed is:

1. An internal-combustion-engine warm-up apparatus comprising:
   a post-processing apparatus that has a catalyst, and removes nitrogen oxides in exhaust gas discharged from an engine in an exhaust path where the exhaust gas passes;
   a heater arranged upstream of the post-processing apparatus on the exhaust path;
   a circulation path where air having passed through the post-processing apparatus is fed back to an upstream side of the heater;
   a blower that feeds air heated by the heater to the post-processing apparatus;
   a coolant flow path where a coolant of the engine flows;
   a heat exchanger that warms the coolant in the coolant flow path by causing heat exchange between the heated air having passed through the post-processing apparatus and the coolant; and
   a control apparatus that controls operation of the heater and the blower, wherein
   in a state where the engine is stopped, the control apparatus causes the heater and the blower to operate, and causes the air heated by the heater to be supplied to the post-processing apparatus and the heat exchanger.

2. The internal-combustion-engine warm-up apparatus according to claim 1, wherein the control apparatus causes the heater and the blower to operate in a case that a temperature of the catalyst in the post-processing apparatus is equal to or lower than a predetermined threshold.

3. The internal-combustion-engine warm-up apparatus according to claim 1, wherein
   the heat exchanger is arranged on the exhaust path,
   the circulation path includes a first branch path that branches off from the exhaust path at a portion located upstream of the heat exchanger,
   the internal-combustion-engine warm-up apparatus further comprises a first valve that is arranged at the portion where the first branch path branches off from the exhaust path, and switches between a state where the heated air flows through the first branch path, and a state where the heated air flows through the exhaust path, and
   in a case that a temperature of the engine exceeds a predetermined threshold in a state where the heated air is being supplied to the post-processing apparatus and the heat exchanger, the control apparatus controls the first valve, and causes the heated air to flow through the first branch path, and to circulate in the circulation path.

4. The internal-combustion-engine warm-up apparatus according to claim 3, wherein in a case that the temperature of the engine exceeds the predetermined threshold in a state where the heated air is being supplied to the post-processing apparatus and the heat exchanger, the control apparatus controls the first valve, and causes the heated air to flow only through the first branch path, and to circulate in the circulation path.

5. The internal-combustion-engine warm-up apparatus according to claim 3, wherein
   the heat exchanger is arranged on the exhaust path,
   the circulation path includes a second branch path that branches off from the exhaust path at a portion located downstream of the heat exchanger, the internal-combustion-engine warm-up apparatus further comprises a second valve that is arranged at the portion where the second branch path branches off from the exhaust path, and switches between a state where the heated air flows through the second branch path, and a state where the heated air flows through the exhaust path, and the control apparatus controls the first valve and the second valve, switches the first valve to the state where the heated air flows through the exhaust path, and switches the second valve to the state where the heated air flows through the second branch path before the heater and the blower are caused to operate, and thereafter causes the heater and the blower to operate to supply the heated air to the post-processing apparatus and the heat exchanger.

6. The internal-combustion-engine warm-up apparatus according to claim 1, wherein the circulation path is a first circulation path where the air having passed through the post-processing apparatus is fed back to a position that is on the exhaust path, and is located downstream of a turbocharger and upstream of the heater, and an air pump is arranged as the blower on the first circulation path.

7. The internal-combustion-engine warm-up apparatus according to claim 1, wherein the circulation path is a second circulation path where the air having passed through the post-processing apparatus is fed back to an intake path of a turbocharger, and the heat exchanger is a low-pressure EGR cooler arranged on the second circulation path.

* * * * *